(12) United States Patent
Savagian et al.

(10) Patent No.: US 8,302,337 B2
(45) Date of Patent: Nov. 6, 2012

(54) ENHANCED GRAPHIC, ANTI-SLIP FLOOR SIGNAGE

(75) Inventors: Michael D. Savagian, Germantown, WI (US); Steven H. Mess, Franklin, WI (US)

(73) Assignee: Brady Worldwide, Inc., Milwaukee, WI (US)

(*) Notice: Subject to any disclaimer, the term of this patent is extended or adjusted under 35 U.S.C. 154(b) by 265 days.

(21) Appl. No.: 12/794,108

(22) Filed: Jun. 4, 2010

(65) Prior Publication Data

US 2011/0296727 A1 Dec. 8, 2011

(51) Int. Cl.
*G09F 19/00* (2006.01)

(52) U.S. Cl. ............................ 40/615; 52/177

(58) Field of Classification Search ............ 40/546, 40/583, 612, 615
See application file for complete search history.

(56) References Cited

U.S. PATENT DOCUMENTS

| | | | |
|---|---|---|---|
| 2,551,622 A * | 5/1951 | Mohr | ........................... 40/546 |
| 5,587,218 A | 12/1996 | Betz | |
| 6,041,533 A | 3/2000 | Lemmond, Jr. | |
| 6,180,228 B1 | 1/2001 | Mueller et al. | |
| 2003/0203165 A1 | 10/2003 | Nobles et al. | |
| 2006/0204701 A1 | 9/2006 | Eichenberger | |
| 2008/0020166 A1 | 1/2008 | Esposito et al. | |

FOREIGN PATENT DOCUMENTS

WO 9718947 A1 5/1997

* cited by examiner

*Primary Examiner* — Joanne Silbermann
(74) *Attorney, Agent, or Firm* — Whyte Hirschboeck Dudek SC

(57) ABSTRACT

A floor sign comprises:
A. A mounting adhesive layer comprising a top facial surface and a bottom facial surface;
B. A graphics layer comprising (1) dark and light areas, and (2) a top facial surface and a bottom facial surface, the bottom facial surface of the graphics layer in direct contact with the top facial surface of the mounting adhesive layer;
D. A cover film layer comprising a top facial surface and a bottom facial surface, the bottom facial surface of the cover layer in direct contact with the top facial surface of the graphics layer; and
E. An anti-slip layer comprising a top facial surface and a bottom facial surface, the bottom facial surface of the anti-slip layer in direct contact with the top facial surface of the cover layer, with the proviso that the anti-slip layer is coincident with the dark areas of the graphics layer.

20 Claims, 3 Drawing Sheets ns. In one aspect the
ENHANCED GRAPHIC, ANTI-SLIP FLOOR SIGNAGE

BACKGROUND OF THE INVENTION

1. Field of the Invention

This invention relates to floor signage. In one aspect the invention relates to floor signage exhibiting durable, legible graphics while in another aspect, the invention relates to floor signage exhibiting an anti-slip property.

2. Description of the Related Art

Durable floor marking signs that will withstand heavy traffic under industrial conditions are desired for use in factories. Examples of heavy traffic include the wheels of a forklift, hand cart and/or pallet jack going straight, turning or pivoting on the sign; cleaning scrubbers removing dirt from the sign; skids dragged across the sign; metal shavings or debris embedded into wheels or other objects tracked across the sign; and frequent foot traffic upon the signs. The tape should be easy to install in straight lines, repositionable yet build sufficiently high adhesion. Typically, the signs are only for indoor use, available in multiple colors, and capable being printed with various graphics such as traffic warnings, fire extinguisher locations, and the like.

Current products on the market are made by printing the appropriate graphic onto a tape or other substrate, and then protecting the graphic either with a durable over-laminate or with a coating. For industrial use and to make it especially obvious, the signs tend to be large and thus take a significant amount of floor space relative to the size of the average shoe. As such, the signs need to be made with a top layer that will provide traction to protect against injuries that can result from a slip or trip and fall.

While most clean, dry surfaces have a fair degree of slip resistance as measured by various methods, e.g., a variable incidence tribometer, many surfaces will become slippery when wet. The usual method to keep slip resistance high on wet surfaces is to provide roughness on the surface. This allows traction to develop with the high spots while the liquid will accumulate and drain away through the low spots. This is accomplished by imparting a texture of some degree in the surface. Texture is usually applied by embossing, abrading or including particles in a film or coating. Traction on an embossed film may be enhanced by increasing the compliance (softness) of the film, resulting in some compression on the high spots as well.

The drawback of rough surfaces is that non-smooth surfaces tend to accumulate dirt which is very common on factory floors. This dirt is tracked or otherwise brought into contact with the surface of the floor signs, and it accumulates on the sign from embedding into a soft coating or film and/or lodging into crevices and low spots on the film. This results in a floor graphic that is soon obliterated by the dirt, and thus defeated from its function of providing information.

SUMMARY OF THE INVENTION

In one embodiment the invention is a floor sign comprising:
  A. A mounting or first adhesive layer comprising a top or first facial surface and a bottom or second facial surface;
  B. An optional release liner comprising a top or first facial surface and a bottom or second facial surface, the top facial surface of the release liner in direct contact with the bottom facial surface of the adhesive layer;
  C. A graphics layer comprising (1) dark and light areas, and (2) a top or first facial surface and a bottom or second facial surface, the bottom facial surface of the graphics layer in direct contact with the top facial surface of the mounting adhesive layer;
  D. A translucent, preferably a transparent, cover or first film layer comprising a top or first facial surface and a bottom or second facial surface, the bottom facial surface of the cover layer in direct contact with the top facial surface of the graphics layer; and
  E. An anti-slip layer comprising a top or first facial surface and a bottom or second facial surface, the bottom facial surface of the anti-slip layer in direct contact with the top facial surface of the cover layer, with the proviso that the anti-slip layer is applied to the cover layer so as to cover essentially only the dark areas of the graphics layer.

In one embodiment an optional laminating or second adhesive layer comprising a top or first facial surface and a bottom or second facial surface is positioned between the graphics layer and the cover layer such that the bottom facial surface of the laminating adhesive layer is in direct contact with the top facial surface of the graphics layer and the top facial surface of the laminating adhesive layer is in direct contact with the bottom facial surface of the cover layer.

In one embodiment an optional substrate or second film layer comprising a top or first facial surface and a bottom or second facial surface is positioned between the mounting adhesive layer and the graphics layer such that the bottom facial surface of the substrate layer is in direct contact with the top facial surface of the mounting adhesive layer and the top facial surface of the substrate layer is in direct contact with the bottom facial surface of the graphics layer.

In one embodiment (as shown in FIG. 1B) the optional substrate layer is positioned between the mounting adhesive layer and the graphics layer such that the bottom facial surface of the substrate layer is in direct contact with the top facial surface of the mounting adhesive layer and the top facial surface of the substrate layer is in direct contact with the bottom facial surface of the graphics layer, and the optional laminating adhesive layer is positioned between the graphics layer and the cover layer such that the bottom facial surface of the laminating adhesive layer is in direct contact with the top facial surface of the graphics layer and the top facial surface of the laminating adhesive layer is in direct contact with the bottom facial surface of the cover layer.

In one embodiment (as shown in FIG. 1C) the optional substrate layer is positioned between the mounting adhesive layer and the optional laminating adhesive layer such that the bottom facial surface of the substrate layer is in direct contact with the top facial surface of the mounting adhesive layer and the top facial surface of the substrate layer is in direct contact with the bottom facial surface of the optional laminating adhesive layer, and the graphics layer is positioned between the optional laminating adhesive layer and the cover layer such that the bottom facial surface of the graphics layer is in direct contact with the top facial surface of the optional laminating adhesive layer and the top facial surface of the graphics layer is in direct contact with the bottom facial surface of the cover layer.

In one embodiment the optional substrate layer is a white film, preferably a white polyester film. In one embodiment the substrate film layer is treated to enhance its receptivity and adhesion to the graphics layer. In one embodiment the graphics layer is reverse printed to the bottom facial surface of the translucent cover layer. In one embodiment the dark areas of the graphics layer comprise black ink. In one embodiment the cover film is a translucent polyester film, the top facial surface of which is treated to enhance its receptivity and adhesion to the anti-slip layer. In one embodiment the anti-slip layer is printed to the cover film.

BRIEF DESCRIPTION OF THE DRAWINGS

The invention is described generally with reference to the drawings for the purpose of illustrating certain embodiments only, and not for the purpose of limiting the scope of the invention. In the drawings like numerals are used to designate like parts throughout the same.

DETAILED DESCRIPTION OF THE PREFERRED EMBODIMENT

Figure 1A:
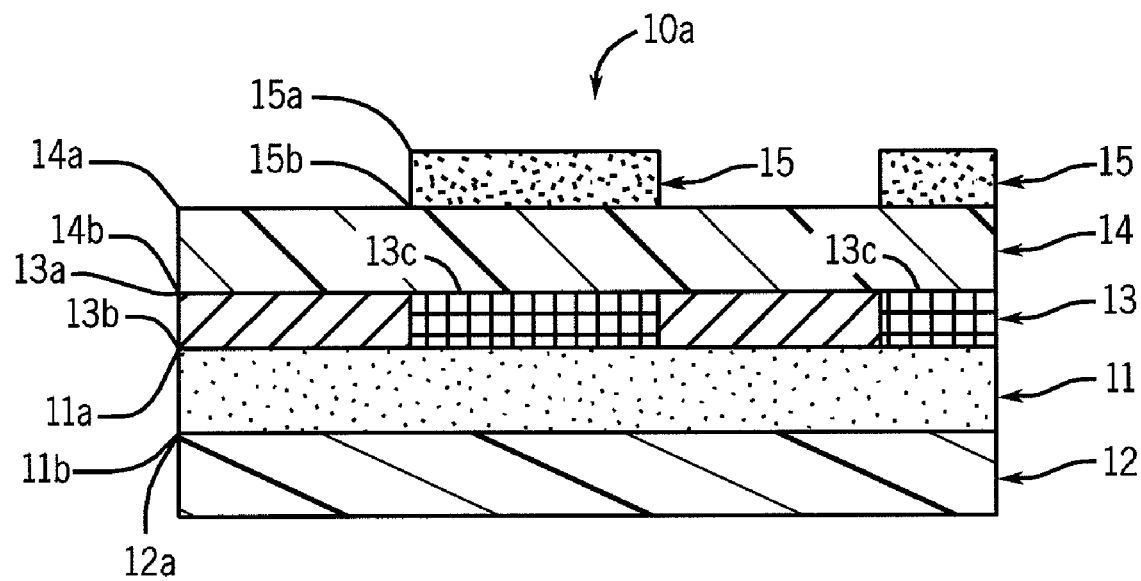
FIG. 1A is a schematic side view of one embodiment of a floor sign of this invention that comprises an anti-slip layer over a clear cover layer over a graphics layer over a mounting adhesive layer over an optional release liner.

"Facial surface", "planar surface", "top surface", "bottom surface" and the like are used in distinction to "edge surface". If rectangular in shape or configuration, a sign will comprise two opposing facial surfaces joined by four edge surfaces (two opposing pairs of edge surfaces, each pair intersecting the other pair at right angles). If circular in configuration, then the sign will comprise two opposing facial surfaces joined by one continuous edge surface.

"Ink" and like terms mean a coatable or printable formulation that can and usually does contain a dye and/or pigment.

"Dye" and like terms mean a visible light absorbing compound that is present in a molecularly dispersed (dissolved) form.

"Pigment" and like terms mean a visible light absorbing material or compound that is present in a non-molecularly dispersed (particulate) form.

"Graphic", "graphic image" and like terms mean text or pictorial representations formed of ink or other dye or pigment substances. Graphics include, but are not limited to, words, numbers, bar codes, pictures, designs (geometric or otherwise), and solid colors (typically applied by flood coating).

"Translucent" as used in the context of this invention includes transparent.

The invention is described generally with reference to the drawings for the purpose of illustrating certain embodiments only, and not for the purpose of limiting the scope of the invention. In the drawings like numerals are used to designate like parts throughout the same.

FIG. 1A is a schematic side view of one embodiment of this invention. Floor sign 10A comprises mounting adhesive layer 11 top facial surface 11a of which is in direct contact with bottom facial surface 13b of graphics layer 13. Top facial surface 13a of graphics layer 13 is in direct contact with bottom facial surface 14b of cover layer 14, and top facial surface 14a of cover layer 14 is in direct contact with bottom facial surface 15b of anti-slip layer 15. Anti-slip layer 15 is applied only to those areas of cover layer 14 that are coincident with dark areas 13c of graphics layer 13. As used in the context of the dark areas of the graphics layer and the anti-slip layer, "coincident" means that the anti-slip layer is essentially congruent with the dark areas of the graphics layer notwithstanding the presence or absence of any intervening layer, e.g., a laminating adhesive layer. As such, the areas of cover layer 14 that are over, i.e., coincident with, the light areas of graphic layer 13 and top facial surface 15a of anti-slip layer 15 are open to the environment and subject to whatever traffic the sign may bear when installed on a floor. As is evident from this discussion of the graphic and anti-slip layers, both can be continuous or discontinuous, i.e., both can cover the complete surface of their respective underlying layers or both can cover only parts of their respective underlying layers. In the case of the latter, information is usually imparted to the floor sign by printing the substrate or cover layer with graphics such that some area of the substrate or cover layer is unprinted and thus left blank. This blank area is then covered by whatever layer covers and is in direct contact with the graphics layer.

Bottom facial surface 11b of mounting adhesive layer 11 is in direct contact with top facial surface 12a of optional release liner 12. At the time sign 10A is ready for application to a floor (not shown), release liner 12 is removed from mounting adhesive layer 11, the liner discarded, and sign 10A applied to floor such that it securely attaches through the binding power of mounting adhesive layer 11.

Figure 1B:
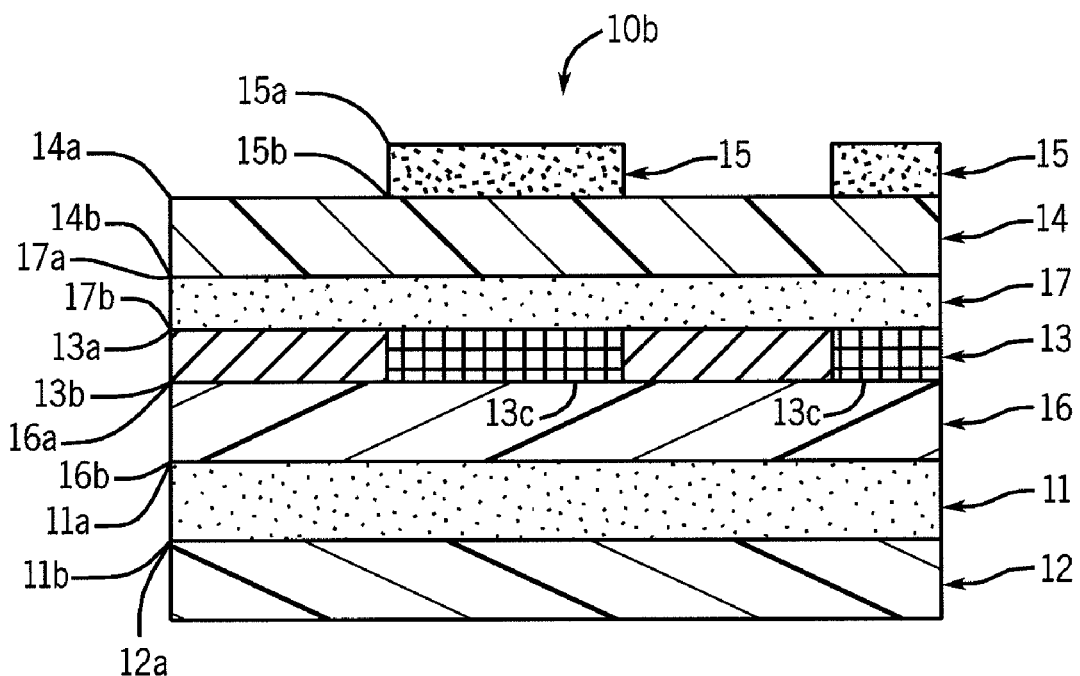
FIG. 1B is a schematic side view of the embodiment of FIG. 1A further comprising an optional substrate layer positioned between the mounting adhesive layer and the graphics layer and an optional laminating adhesive layer positioned between the graphics layer and the clear cover layer.

FIG. 1B is a schematic side view of the embodiment of FIG. 1A further comprising an optional substrate layer positioned between the mounting adhesive layer and the graphics layer and an optional laminating adhesive layer positioned between the graphics layer and the clear cover layer. In FIG. 1B, sign 10B further comprises optional substrate or second film layer 16 which comprises a top or first facial surface 16a and a bottom or second facial surface 16b and is positioned between mounting adhesive layer 11 and graphics layer 13 such that bottom facial surface 16b is in direct contact with top facial surface 11a of mounting adhesive layer 11 and top facial surface 16a is in direct contact with bottom facial surface 13b of graphics layer 13. Sign 10B further comprises optional laminating or second adhesive layer 17 which comprises top or first facial surface 17a and bottom or second facial surface 17b and is positioned between graphics layer 13 and clear cover layer 14 such that bottom facial surface 17b is in direct contact with top facial surface 13a of graphics layer 13 and top facial surface 17a is in direct contact with bottom facial surface 14b of clear cover layer 14.

Figure 1C:
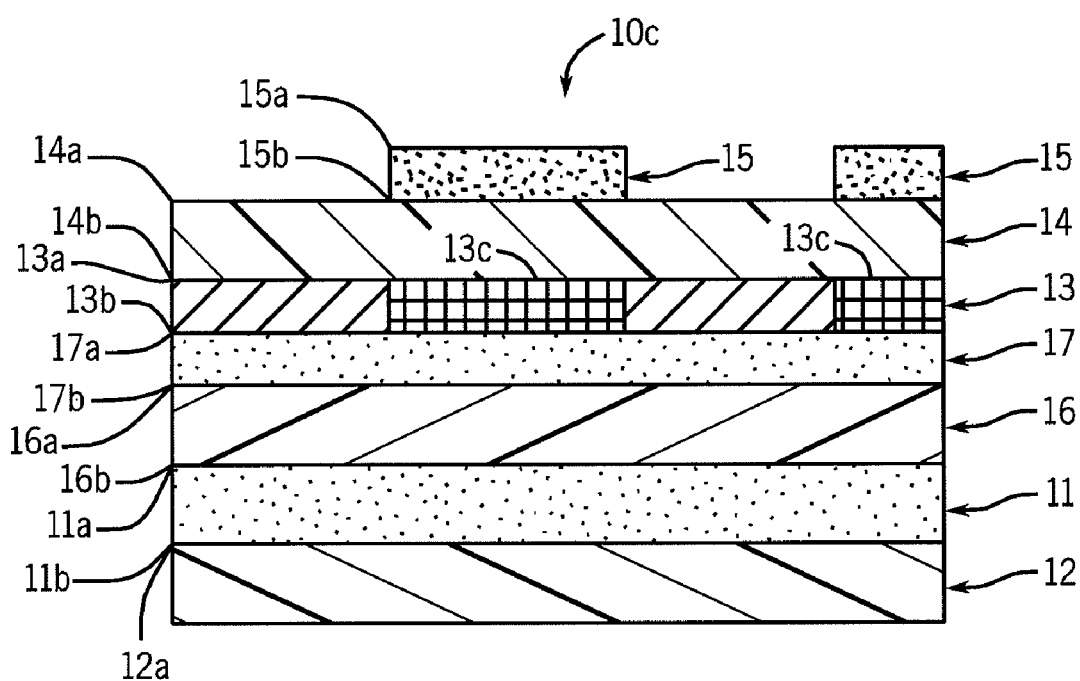
FIG. 1C is a schematic side view of the embodiment of FIG. 1A further comprising an optional substrate layer positioned over the mounting adhesive layer and an optional laminating adhesive layer positioned between the substrate layer and the graphics layer.

FIG. 1C is a schematic side view of the embodiment of FIG. 1B in which laminating adhesive layer 17 is re-positioned between substrate layer 16 and graphics layer 13 such that bottom facial surface 17b is in direct contact with top facial surface 16a of substrate layer 16 and top facial surface 17a is in direct contact with bottom facial surface 13b of graphics layer 13.

Not shown but also an embodiment of this invention are anti-skid floor signs comprising one or the other, but not both, the optional substrate layer and laminating adhesive layer. In these embodiments the substrate layer is typically, but not necessarily, positioned between the mounting adhesive layer and the graphics layer, and the laminating adhesive layer is typically, but not necessarily, positioned between the graphics layer and the cover layer.

Substrate layer 16 can comprise any film, preferably a film free of plasticizer, of sufficiently high hardness and modulus of elasticity, e.g., polyester, polycarbonate, polyacrylate, polyimide and the like. In one embodiment, the substrate layer is a film that exhibits a Shore A Hardness of at least 90, preferably of at least 92 and more preferably of at least 94 as measured by ASTM D2240-05, and a modulus of elasticity of at least 200,000, preferably at least 300,000, more preferably at least 500,000 and even more preferably at least 600,000, psi as measured by ASTM-D882-02 Modulus. On the Shore D Hardness scale (also measured by ASTM D2240-05) the hardness of the polyester is between 40 and 90. The film of choice is polyester, especially polyethylene terephthalate (PET). The absence of plasticizer, such as that present in many, if not most, PVC films, eliminates plasticizer migration and the problems associated with it. The substrate film, with or without any facial surface treatment or coating, is sufficiently opaque, preferably white, so as to enhance the legibility of any printed or otherwise applied graphic to it.

Substrate film layer 16 may be coated (not shown) or otherwise treated on one or both facial surfaces. If coated or otherwise treated on a facial surface that is in direct contacted with graphic layer 13, then the purpose of the coating or treatment is usually to promote adhesion of the graphic to the substrate film. Promoting materials (primers) include a broad range of polymer-based coatings (thermoplastic polyesters, acrylates, vinyl (e.g., polyvinyl chloride), vinylidene chloride, urethanes, epoxies and the like, typically compounded with various adhesion promoting additives such as silanes, silicas, titanates and various crosslinkers (organometallics, isocyanates, melamines, and the like). Two examples of such adhesion promoters are Adcote 1217D available from The Dow Chemical Company, and Vitel 2100B available from Bostik Findley.

Typically coatings, if present, are applied by the manufacturer of the film but can otherwise be applied by any conventional technology, e.g., flood coating, printing, etc. These optional coatings are typically very thin, e.g., 10 microns or less, and typically, but not necessarily, cover the complete top facial surface of the substrate film. The thickness of the substrate film, with or without one or more coatings, is 3-5 mils (0.076-0.127 millimeters, mm).

As an alternative or in addition to coating, the substrate film may be surface treated to enhance its receptivity to the ink or other colorant of the graphic image. Print adhesion treatments for polyester film are well known, and various methods exist to effect this including mechanical and/or chemical abrasion, flame and corona. Surface treatment of the substrate film does not add to its thickness.

Graphic image 13 can be applied in any manner using any ink or colorant that will make the graphic image visible and understandable to a person viewing it through whatever layers are over it, e.g. optional laminating adhesive layer 17 and/or clear cover film layer 14. In various embodiments the graphic image is printed to the top facial surface of the substrate film layer or coating of the substrate film layer (if one is present), i.e., it is printed such that the graphic image is sandwiched between the top facial surface of the layer to which it is printed or otherwise applied and the bottom facial surface of the film overlying it, e.g., the laminating adhesive or cover film, and thus protected from the environment in which the sign is used. The graphic image comprises dark and light areas, the dark areas typically and preferably the result of black ink and the light areas the result of a light color ink, e.g., white, yellow, or no ink at all (thus the white of the substrate film showing through to the outermost surface of the sign). While the anti-slip coating layer can cover any color of the graphics layer, typically and preferably the dark color of the graphics under the anti-slip coating is black which is the most like the color of the dirt that is likely to accumulate in the anti-slip coating over time and thus obliterate, or at least diminish, the legibility of the sign. For purposes of this invention, black is an achromatic value with little or no hue (and not white or gray). In one embodiment black is as defined in the American National Standard for Safety Color Code (ANSI) Z535.1-2002 for use in floor signs.

Figure 2C:
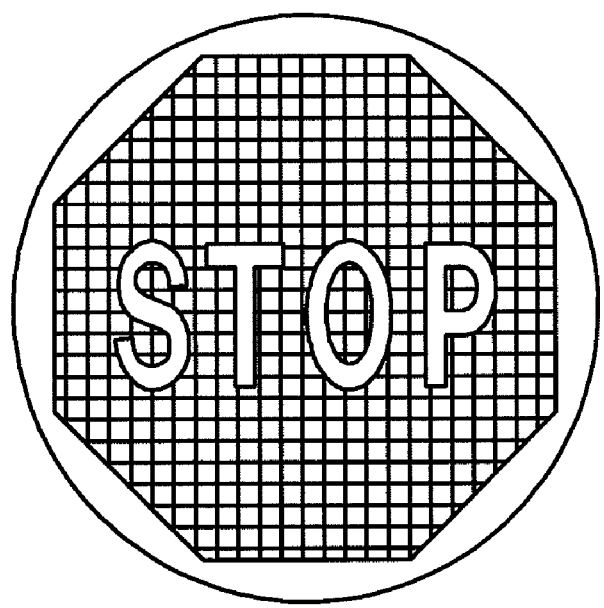
FIG. 2C is a top view of one embodiment of a floor sign conveying information for controlling traffic.
Figure 2A:
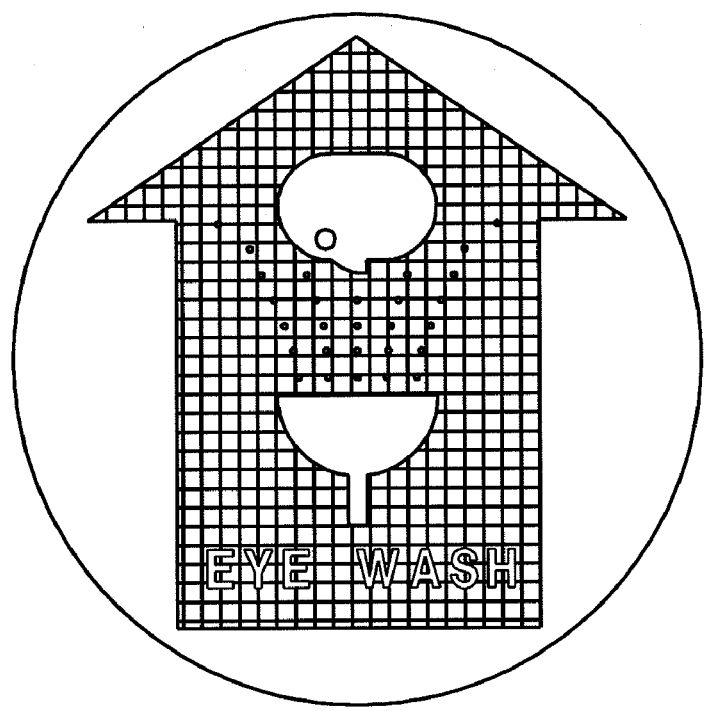
FIG. 2A is a top view of one embodiment of a floor sign conveying directions to an eye wash station.
Figure 2B:
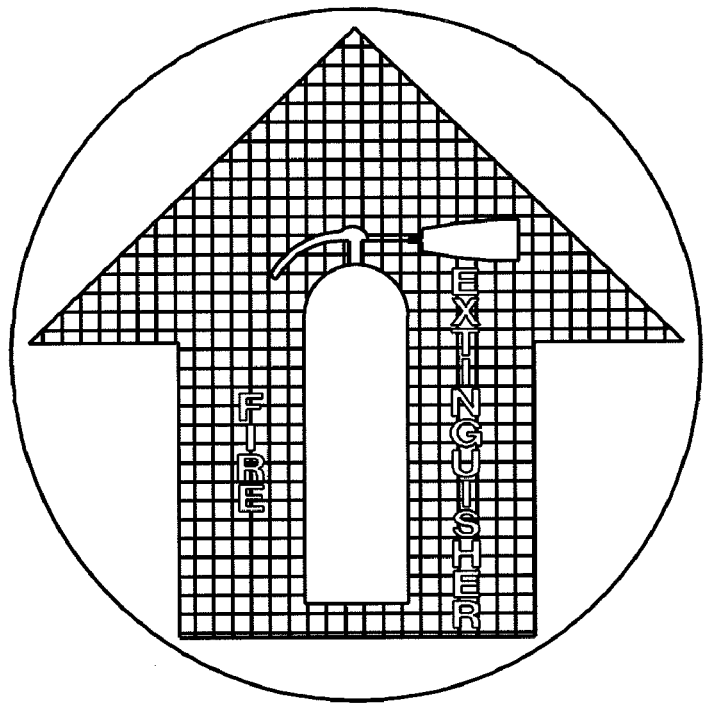
FIG. 2B is a top view of one embodiment of a floor sign conveying directions to a fire extinguisher.

For commercial inkjet printing UV-curable inks are preferred of which Rho Flexible ink set from Durst Phototechnik AG is representative. The color (dark or light) can be applied by other means as well, such as gravure, screen and flexographic printing. The inks may be of any color with the black inks typically and preferably used for conveying information (reverse printing or imaging as illustrated in FIGS. 2A-2C and various colors for attention-getting and background. The thickness of the graphic image is, like the thickness of the optional coating to the substrate film layer, a negligible contributor to the overall thickness of the sign, typically contributing less than 10 microns to the thickness of the sign.

In one preferred embodiment the graphics layer is printed or otherwise applied to an opaque substrate layer, e.g. a white polyester film, and then covered with a translucent cover film. The cover film is typically coated or otherwise covered with a laminating adhesive layer such that the adhesive layer joins the cover layer to the graphics layer.

In one embodiment the graphics layer is subsurface printed or otherwise applied to the bottom facial surface of the cover layer, and then an adhesive, preferably an opaque, e.g., white, adhesive, is used to join the graphic-bearing cover layer to the substrate layer. In one embodiment the graphics layer is subsurface printed or otherwise applied to the bottom facial surface of the cover layer, and then joined to the mounting adhesive layer (FIG. 1A). In this embodiment the mounting adhesive layer is opaque, preferably white.

Translucent, preferably clear or transparent, cover tape 14 can comprise, like the substrate film, any film, preferably a film free of plasticizer, of sufficiently high hardness and modulus of elasticity, e.g., polyester, polycarbonate, polyacrylate, polyimide and the like. In one embodiment, the cover layer is a film that exhibits a Shore A Hardness of at least 90, preferably of at least 92 and more preferably of at least 94 as measured by ASTM D2240-05, and a modulus of elasticity of at least 200,000, preferably at least 300,000, more preferably at least 500,000 and even more preferably at least 600,000, psi as measured by ASTM-D882-02 Modulus. On the Shore D Hardness scale (also measured by ASTM D2240-05) the hardness of the polyester is between 40 and 90. The film of choice is polyester, especially polyethylene terephthalate (PET). The thickness of the cover film, with or without one or more coatings, is 2-5 mils (0.051-0.127 millimeters, mm). Of course, if the graphic image does not cover the entire top facial surface of the substrate layer, then the bottom facial surface of the cover layer will be in direct contact with parts of both the top facial surface of the graphic image and the substrate film (or coating on the film).

Usually slip resistance requires a rough surface. Roughness provides both channels for moisture capture (water collects preferentially in low areas as opposed to high areas) and increased pressure that pushes water away from the peaks of the rough surface. While any increase in roughness will impart improved slip resistance, there are practical manufacturing and application limits in the context of a durable floor sign. If thickness is too great, then wear resistance is reduced due to mechanical conflict of traffic with the higher profile, especially in aggressive environments such as factory floors, notwithstanding an improvement in slip resistance.

Anti-slip layer 15 comprises any material that imparts a rough surface to and adheres well to cover layer 14. The roughness of a typical anti-slip layer 15 can be characterized by a roughness average (Ra) of 5 to 15 microns as determined by JIS B0601-1994 Geometrical Product Specifications. Preferred anti-slip treatments are particulate-loaded compositions in the form of a UV-curable ink, such as Shurfoot™ Anti-Slip which is a UV-curable silk screen printable ink from Polymeric Imaging. The anti-slip treatment is applied only to the cover layer that covers the dark, e.g., black, areas of the graphics layer. The thickness of the anti-slip layer is not particularly important to the invention, but it is typically in the range of 1 to 4 mils (0.025-0.1 mm).

Any PSA that has shear resistance of at least 50, preferably at least 100 and more preferably at least 200, hours as measured by Pressure Sensitive Tape Council (PSTC) 7 with a sample area of one-half by one inch can be used as the adhesive layer (i.e., the mounting adhesive) in the practice of this invention. The adhesive is applied to the bottom surface of the substrate layer, and the adhesive can be clear or colored.

In the embodiments in which a laminating adhesive layer is present, preferably the laminating adhesive also has this minimum shear resistance property, particularly when the laminating adhesive layer is used to laminate the cover layer to the graphics and substrate layers. In the embodiments in which the laminating adhesive layer is over the graphics layer, the laminating adhesive also needs to be translucent. If the floor sign is made with the graphics layer subsurface printed or otherwise applied to the bottom facial surface of the cover layer, then the adhesive can be either translucent or pigmented (opaque). The laminating adhesive layer with this shear resistance property can be either pressure sensitive or heat-activated. In the case of a heat-activated adhesive, it is usually laminated to the substrate layer (and the cover layer if a transfer adhesive) using a heated laminator.

In one embodiment the PSA is a block copolymer in which one of the blocks is "hard", e.g., has a softening temperature of at least 85° C., more typically a softening temperature of at least 90° C. and even more typically a softening temperature of at least 92° C., such as a styrenic block. In one embodiment the softening temperature of the hard block of the copolymer is lower than 85° C. but the copolymer is crosslinked to impart the desired shear resistance. Representative PSA include but are not limited to rubber-based materials such as MORSTIK 123 and 190 both from The Dow Chemical Company, and DUROTAK R6202 available from National Starch, and acrylic-based materials such as AROSET 1860 available from Ashland and GELVA 1753 available from The Dow Chemical Company.

In the case of heat-activated adhesives, the examples are similar to the coatings used for print treating films although the adhesives must be thermoplastic (not crosslinked). This layer is usually coated at a higher coat weight than if used as a print treatment, typically in the range of 4 to 15 pounds per ream of dry coat weight. These include but are not limited to Adcote 1217D available from The Dow Chemical Company, and Vitel 2100B available from Bostik Findley.

In the case of subsurface printed or otherwise applied graphics to the bottom facial surface of the cover layer, the adhesive, typically a pressure sensitive adhesive (PSA), is typically pigmented to enhance the opacity of the substrate layer so as to enhance the legibility of the graphic image. Any pigment that is sufficiently compatible with the PSA can be used, and typically it is white, e.g., titanium dioxide. The pigment can be mixed with the PSA using any conventional technology. "Sufficiently compatible" means that the blended PSA and pigment has the desired opacity and background color (white being preferred) without reducing adhesion (either shear or peel) to a level that causes performance problems (resistance to scrape or twist) in use. The PSA or bottom layer of the sign (the optional release liner excluded), and with or without pigment, has a thickness of 2-3 mil (0.051-0.076 mm). The top facial surface of the PSA is in direct contact with the bottom facial surface of the substrate layer.

The construction of optional release liner 16 is not particularly important to the practice of this invention and its purpose, of course, is to protect the PSA until the sign is ready for application to a floor. Examples of materials that can be used for the liner include glassine paper, laminated paper, polyester film and polypropylene film, preferably each of which has been subjected to a coating of silicone. In one embodiment the sign is without a release liner.

The signs of this invention are constructed in any convenient manner. For example, in the construction of a FIG. 1B floor sign, the mounting adhesive (a PSA such MORSTIK 123) is coated at 32 pounds per ream on a substrate film (e.g., a 0.002" thick white polyester film) and protected with a release liner. The graphics layer is then applied, e.g., printed with an inkjet printer, to the top facial surface of the substrate layer. In a separate operation the laminating adhesive layer is applied to the bottom facial surface of the cover layer e.g., translucent MORSTIK 123 is applied at 16 pounds per ream on 0.003" thick translucent polyester film, and here too the adhesive is protected with a release liner. When ready for assembly, the release liner from the laminating adhesive is removed and discarded, and the laminating adhesive with attached cover layer is laminated to the top facial surface of the graphics layer. After lamination a UV-curable anti-slip coating is applied, preferably by silk screen printing, to the top facial surface of the cover layer. The anti-slip coating is not applied to the entire top facial surface of the cover layer, but only over the areas that contain dark, typically black, printing. The finished sign is then die cut from this sheet to size (typically a 17" diameter circle or 12"×18" rectangle).

In one embodiment, an opaque, white transfer adhesive is compounded and coated at 32 pounds per ream with pigmented PSA, e.g., MORSTIK 123 PSA. Pigment is obtained in a pre-dispersed paste form which is easily mixed into the adhesive to obtain the desired whiteness and opacity. This mix is then cast to a differential release liner (two-sided, release-coated film or paper liner to enable self-winding of the transfer adhesive) on a coater, dried and rewound into a wide roll. The transfer adhesive is slit to an appropriate width for final converting (printing, lamination, die cutting, slitting).

The translucent backing film is subsurface printed with graphics and background (in reverse) and/or flood coated with a UV-curable ink on an inkjet printing press. Typically, at least one added full coverage layer of white ink is utilized to gain satisfactory opacity. Adequate cure and good adhesion of these ink layers contribute to the integrity of the laminate structure. After printing the transfer adhesive is laminated to the graphic and/or substrate layer, and the sign is cut to a finished size (typically a 17" diameter circle or 12" by 18" rectangle).

The floor signs of this invention exhibit a unique combination of anti-slip, legibility, durability and cleaning properties. Conventional floor signs that are easy to clean typically have a smooth surface and while these signs maintain their legibility over time with frequent cleaning, they lack an anti-slip property. Floor signs with an anti-slip treatment are typically difficult to clean because dirt and grit accumulates in the anti-slip treatment and over time, these signs lose their legibility. With the anti-slip treatment limited to the dark areas of the signs of this invention, however, dirt and grit are still easily cleaned from the non-treated areas and these are the areas that convey the sign information. If the sign includes a glossy cover layer over the graphics, the legibility of the sign is enhanced as the anti-skid coated dark outlines of the graphics are matte in nature. This results in a sign that is especially legible, even from low angles. Depending upon the size of the sign, of course, by including sufficient dark area in the graphics (as illustrated in FIGS. 2A-2C), the sign can provide an anti-slip area that will always contact at least a part of the average adult shoe.

Although the invention has been described in considerable detail by the preceding examples and references to the drawings, this detail is for the purpose of illustration and is not to be construed as a limitation upon the spirit and scope of the invention as it is described in the appended claims. All patents and publications cited above, specifically including for U.S. practice all U.S. patents, allowed patent applications and U.S. Patent Application Publications, are incorporated herein by reference.

What is claimed is:

1. A floor sign comprising:
   (A) A mounting adhesive layer comprising a top facial surface and a bottom facial surface;
   (B) An optional release liner comprising a top facial surface and a bottom facial surface, the top facial surface of the release liner in direct contact with the bottom facial surface of the adhesive layer;
   (C) A graphics layer comprising (1) dark and light areas, and (2) a top facial surface and a bottom facial surface, the bottom facial surface of the graphics layer over the top facial surface of the mounting adhesive layer;
   (D) A cover film layer comprising a top facial surface and a bottom facial surface, the bottom facial surface of the cover layer over the top facial surface of the graphics layer; and
   (E) An anti-slip layer comprising a top facial surface and a bottom facial surface, the bottom facial surface of the anti-slip layer in direct contact with the top facial surface of the cover layer, with the proviso that the anti-slip layer is applied to the cover layer so as to cover essentially only the dark areas of the graphics layer.

2. The floor sign of claim 1 further comprising a laminating adhesive layer comprising a top facial surface and a bottom facial surface, the laminating adhesive positioned between the graphics layer and the cover layer such that the bottom facial surface of the laminating adhesive layer is in direct contact with the top facial surface of the graphics layer and the top facial surface of the laminating adhesive layer is in direct contact with the bottom facial surface of the cover layer.

3. The floor sign of claim 2 in which the laminating adhesive layer comprises a translucent pressure sensitive adhesive.

4. The floor sign of claim 1 further comprising a second film layer comprising a top facial surface and a bottom facial surface, the substrate layer positioned between the mounting adhesive layer and the graphics layer such that the bottom facial surface of the substrate layer is in direct contact with the top facial surface of the mounting adhesive layer and the top facial surface of the substrate layer is in direct contact with the bottom facial surface of the graphics layer.

5. The floor sign of claim 4 in which the top facial surface of the second film layer is treated or coated.

6. The floor sign of claim 4 in which the substrate layer is a white polyester film.

7. The floor sign of claim 1 further comprising (i) a substrate layer positioned between the mounting adhesive layer and the graphics layer such that the bottom facial surface of the substrate layer is in direct contact with the top facial surface of the mounting adhesive layer and the top facial surface of the substrate layer is in direct contact with the bottom facial surface of the graphics layer, and (ii) a laminating adhesive layer positioned between the graphics layer and the cover layer such that the bottom facial surface of the laminating adhesive layer is in direct contact with the top facial surface of the graphics layer and the top facial surface of the laminating adhesive layer is in direct contact with the bottom facial surface of the cover layer.

8. The floor sign of claim 7 in which the laminating adhesive layer comprises a translucent pressure sensitive adhesive and the substrate layer comprises an opaque polyester film.

9. The floor sign of claim 1 further comprising (i) a substrate layer and (ii) a laminating adhesive layer, the substrate layer positioned between the mounting adhesive layer and the laminating adhesive layer such that the bottom facial surface of the substrate layer is in direct contact with the top facial surface of the mounting adhesive layer and the top facial surface of the substrate layer is in direct contact with the bottom facial surface of the laminating adhesive layer, and the laminating adhesive layer positioned between the graphics layer and the substrate layer such that the bottom facial surface of the laminating adhesive layer is in direct contact with the top facial surface of the substrate layer and the top facial surface of the laminating adhesive layer is in direct contact with the bottom facial surface of the graphics layer.

10. The floor sign of claim 9 in which the laminating adhesive layer comprises an opaque pressure sensitive adhesive and the substrate layer comprises an opaque polyester film.

11. The floor sign of claim 1 in which the cover layer is a translucent polyester film.

12. The floor sign of claim 1 in which the dark areas of the graphics layer are black ink.

13. The floor sign of claim 12 in which the dark areas of the graphics layer are background and the light areas convey information.

14. The floor sign of claim 12 in which the light areas of the graphics layer are without ink.

15. The floor sign of claim 1 in which the mounting adhesive layer comprises a pressure sensitive adhesive.

16. The floor sign of claim 1 in which the anti-slip layer comprises a particulate-loaded, UV-curable silk screen printable ink.

17. A floor sign comprising:
   (A) A substrate layer comprising a top facial surface and a bottom facial surface;
   (B) A graphics layer comprising (1) dark and light areas, and (2) a top facial surface and a bottom facial surface, the bottom facial surface of the graphics layer in direct contact with the top facial surface of the substrate layer;
   (C) A translucent laminating adhesive layer comprising a top facial surface and a bottom facial surface, the bottom facial surface in direct contact with the top facial surface of the graphics layer;
   (D) A translucent cover film layer comprising a top facial surface and a bottom facial surface, the bottom facial surface of the cover layer in direct contact with the top facial surface of the laminating adhesive layer;
   (E) An anti-slip layer comprising a top facial surface and a bottom facial surface, the bottom facial surface of the anti-slip layer in direct contact with the top facial surface of the cover layer, with the proviso that the anti-slip layer is coincident with the dark areas of the graphics layer;

(F) A mounting adhesive layer comprising a top facial surface and a bottom facial surface, the top facial surface of the mounting adhesive layer in direct contact with the bottom facial surface of the substrate layer; and (G) An optional release liner comprising a top facial surface and a bottom facial surface, the top facial surface of the release liner in direct contact with the bottom facial surface of the adhesive layer.

18. The floor sign of claim 17 in which the substrate layer comprises an opaque film, the laminating and mounting adhesive layers comprise a pressure sensitive adhesive, the cover layer comprises a translucent polyester film, and the dark area of the graphics layer comprise black ink.

19. A floor sign comprising:

(A) A substrate film layer comprising a top facial surface and a bottom facial surface;

(B) A laminating adhesive layer comprising a top facial surface and a bottom facial surface, the bottom facial surface in direct contact with the top facial surface of the substrate layer;

(C) A graphics layer comprising (1) dark and light areas, and (2) a top facial surface and a bottom facial surface, the bottom facial surface of the graphics layer in direct contact with the top facial surface of the laminating adhesive layer;

(D) A translucent cover film layer comprising a top facial surface and a bottom facial surface, the bottom facial surface of the cover layer in direct contact with the top facial surface of the graphics layer;

(E) An anti-slip layer comprising a top facial surface and a bottom facial surface, the bottom facial surface of the anti-slip layer in direct contact with the top facial surface of the cover layer, with the proviso that the anti-slip layer is coincident with the dark areas of the graphics layer;

(F) A mounting adhesive layer comprising a top facial surface and a bottom facial surface, the top facial surface of the mounting adhesive layer in direct contact with the bottom facial surface of the substrate layer; and (G) An optional release liner comprising a top facial surface and a bottom facial surface, the top facial surface of the release liner in direct contact with the bottom facial surface of the adhesive layer.

20. The floor sign of claim 19 in which the substrate layer comprises an opaque film, the laminating and mounting adhesive layers comprise a pressure sensitive adhesive, the cover layer comprises a translucent polyester film, and the dark area of the graphics layer comprise black ink.

\* \* \* \* \*